US009652627B2

(12) United States Patent
Bhagwan et al.

(10) Patent No.: US 9,652,627 B2
(45) Date of Patent: May 16, 2017

(54) PROBABILISTIC SURFACING OF POTENTIALLY SENSITIVE IDENTIFIERS

(71) Applicant: INTERNATIONAL BUSINESS MACHINES CORPORATION, Armonk, NY (US)

(72) Inventors: Varun Bhagwan, San Jose, CA (US); Laura Chiticariu, San Jose, CA (US); Daniel F. Gruhl, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 16 days.

(21) Appl. No.: 14/521,288

(22) Filed: Oct. 22, 2014

(65) Prior Publication Data
US 2016/0117522 A1   Apr. 28, 2016

(51) Int. Cl.
G06F 7/04       (2006.01)
G06F 21/62      (2013.01)
G06N 99/00      (2010.01)
G06N 7/00       (2006.01)

(52) U.S. Cl.
CPC ......... G06F 21/6245 (2013.01); G06N 7/005 (2013.01); G06N 99/005 (2013.01)

(58) Field of Classification Search
CPC ....... G06F 21/10; G06F 19/321; G06F 19/322
USPC .................................................. 726/26, 28
See application file for complete search history.

(56) References Cited

U.S. PATENT DOCUMENTS

| | | | | |
|---|---|---|---|---|
| 5,585,793 A | * | 12/1996 | Antoshenkov | ...... H03M 7/3088 341/106 |
| 7,639,714 B2 | | 12/2009 | Stolfo et al. | |
| 8,819,849 B2 | * | 8/2014 | Birtwhistle | ........... G06F 19/322 713/182 |
| 2003/0101181 A1 | * | 5/2003 | Al-Kofahi | ......... G06F 17/30707 |
| 2010/0138231 A1 | * | 6/2010 | Linthicum | ............ G06F 19/321 705/2 |

(Continued)

FOREIGN PATENT DOCUMENTS

| | | |
|---|---|---|
| EP | 2439684 A2 | 4/2012 |
| WO | 2010062830 A2 | 6/2010 |
| WO | 2013091807 A1 | 6/2013 |

OTHER PUBLICATIONS

Shende et al., "Domain Specific Named Entity Recognition Using Supervised Approach," International Journal of Computational Linguistics (IJCL), vol. (3) : Issue (1) : 2012.

(Continued)

*Primary Examiner* — Samson Lemma
(74) *Attorney, Agent, or Firm* — Erik Huestis; Stephen Kenny; Foley Hoag LLP

(57) ABSTRACT

Probabilistic surfacing of potentially sensitive identifiers is provided. In one embodiment of the present invention, a method of and computer program product for surfacing of potentially sensitive identifiers are provided. An input string is read. The input string has a length. The input string is divided into a plurality of tokens. Each of the tokens has a predetermined length. A score is determined for each of the plurality of tokens. A composite score is determined based on the scores of each of the plurality of tokens. Whether the input string comprises an identifier is determined by comparing the composite score to a predetermined threshold.

16 Claims, 3 Drawing Sheets

(56) References Cited

U.S. PATENT DOCUMENTS

| | | | | |
|---|---|---|---|---|
| 2011/0208513 A1* | 8/2011 | Nicks | ............... | G06F 17/2705 |
| | | | | 704/10 |
| 2011/0208723 A1* | 8/2011 | Nicks | ............... | G06F 17/30672 |
| | | | | 707/723 |
| 2012/0317098 A1* | 12/2012 | Okato | ............... | G06F 17/30613 |
| | | | | 707/722 |
| 2014/0129569 A1* | 5/2014 | Seeger, III | ............... | G06Q 10/101 |
| | | | | 707/748 |
| 2015/0379127 A1* | 12/2015 | Mueller | ............... | G06F 17/18 |
| | | | | 707/741 |

OTHER PUBLICATIONS

Newell, "A Probabilistic Approach to Gestural Recognition and Dialogue Management," A Dissertation Submitted to the Faculty of the Department of Computer Science in Partial Fulfillment of the Requirements for the Degree of Doctor of Philosophy in the Graduate College the University of Arizona, 1995.

Miklau et al., "Securing history: Privacy and accountability in database systems,"3rd Biennial Conference on Innovative Data Systems Research (CIDR) Jan. 7-10, 2007, Asilomar, California, USA.

Szarvas et al., "State-of-the-art Anonymization of Medical Records Using an Iterative Machine Learning Framework," J. Am. Med. Inform. Assoc. 14 (Sep.-Oct.) (5)) (2007) 574-580.

Sibanda et al., "Role of Local Context in Automatic Deidentification of Ungrammatical, Fragmented Text," Proceedings of the Human Language Technology Conference of the North American Chapter of the ACL, pp. 65-73, New York, Jun. 2006. copyright 2006 Association for Computational Linguistics.

* cited by examiner

PROBABILISTIC SURFACING OF POTENTIALLY SENSITIVE IDENTIFIERS

BACKGROUND

Embodiments of the present invention relate to detection of potentially identifying information in records, and more specifically, to probabilistic surfacing of potentially sensitive identifiers.

BRIEF SUMMARY

According to one embodiment of the present invention, a method of and computer program product for surfacing of potentially sensitive identifiers are provided. An input string is read. The input string has a length. The input string is divided into a plurality of tokens. Each of the tokens has a predetermined length. A score is determined for each of the plurality of tokens. A composite score is determined based on the scores of each of the plurality of tokens. Whether the input string comprises an identifier is determined by comparing the composite score to a predetermined threshold.

DETAILED DESCRIPTION

As the quantity of digital data retained by service providers increases, the privacy risk to individuals also increases. Individually identifying data may be a security risk as well as privacy risk. Information such as social security numbers and credit card numbers may be used for identity theft. Information such as device serial numbers or license plate numbers may be used to facilitate theft or other crime.

In the medical context, privacy as to personal data is provided for under the Health Insurance Portability and Accountability Act (HIPAA). In particular, the disclosure of Protected Health Information (PHI) is regulated. PHI includes information related to health care that can be linked to an individual. Such information includes names, geographical identifiers, dates associated with an individual, phone numbers, fax numbers, email addresses, social security numbers, medical record numbers, health insurance beneficiary numbers, account numbers, certificate or license numbers, vehicle identification numbers (VIN), vehicle serial numbers, license plate numbers, device identifiers or serial numbers, URLs, IP addresses, biometric identifiers (such as fingerprints, palm veins, facial features, DNA, palm prints, hand geometry, iris prints, retina prints, or scent), facial photographs, or other unique identifiers or codes.

In order to conduct research using existing medical records, researchers may be required to remove identifying data from a data set (de-identification). Removal of identifying data such as PHI ensures the privacy of study participants.

Spotting these unique identifiers, certificates, VIN numbers, license plate numbers is thus critical task for complying with regulatory requirements such as those provided for under HIPAA. One approach to screening a dataset for identifiers is to detect known patters in that input dataset. For example, social security numbers are nine digit sequences of the form 000-00-0000. By scanning for this pattern in an input data set, properly formatted social security numbers can be located. Similarly, credit card numbers are generally 15-16 digit numbers that may be validated by a checksum such as the Luhn algorithm. By scanning for numeric strings of the appropriate length and validating them by the Luhn algorithm, credit card numbers may be detected in an input data set.

However, such an approach requires that all patterns of identifiers be known in advance. As a result, identifiers that do not conform to a known pattern will not be detected. For example, a serial number on a newly introduced device would not have a previously known pattern and thus would not be detectable without updating the detection system with a new pattern. Accordingly, systems and methods presented herein allow the detection of identifying information without the need to know all patterns of identifiers a priori.

Figure 1:
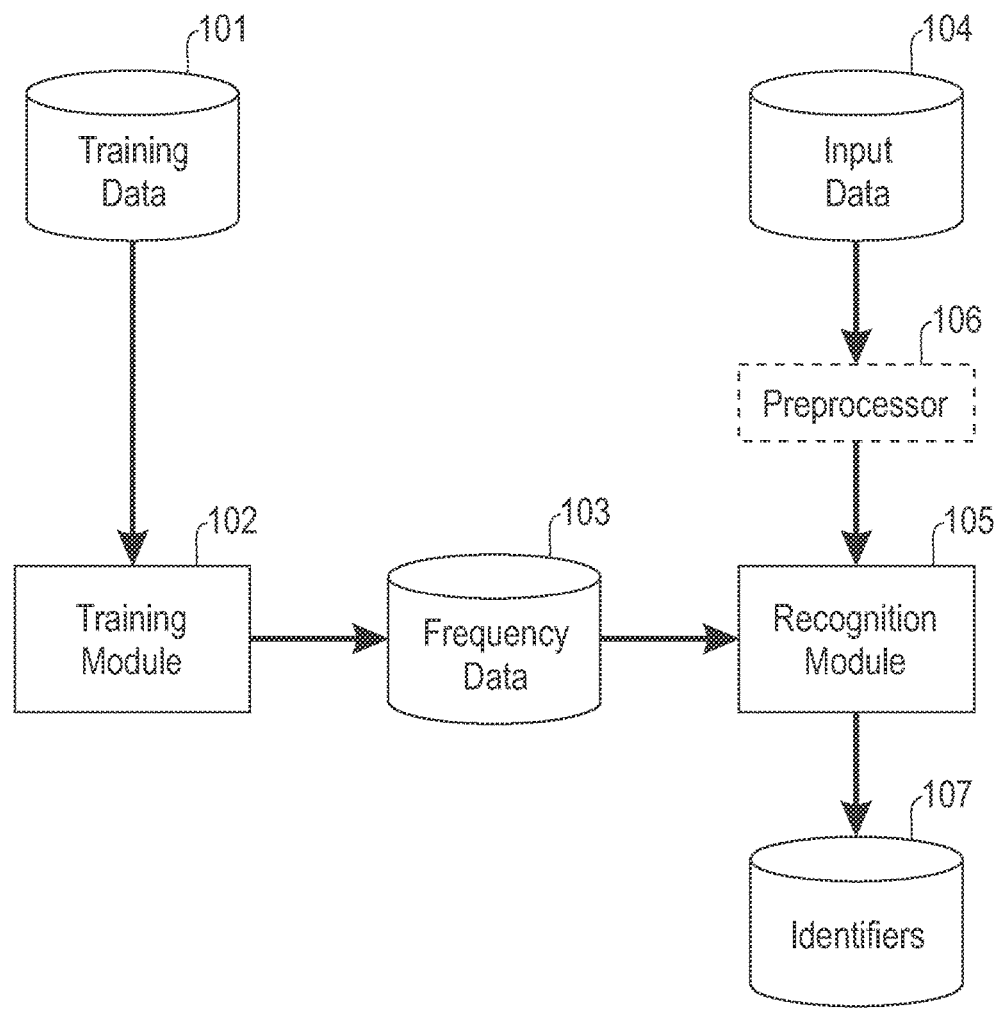
FIG. 1 depicts a system for surfacing of potentially sensitive identifiers according to embodiments of the present disclosure.

With reference now to FIG. 1, a system for recognition of identifiers in an input data set is provided. Training data 101 is provided to training module 102. Training data 101 includes a variety of data such as documents. In some embodiments, the training data includes subject matter specific documents, such as medical records. However, in other embodiments, the training data includes a variety of documents without regard to subject matter. Training data may be represented in a variety of digital forms known in the art, including XML, plain text, various proprietary word processing files, social media feeds such as those provided by RSS or microblogging services, or other computer readable formats.

Training module 102 breaks training data 101 into a plurality of tokens of length n. In some embodiments, n=2. As an example, for input data "two words" and n=2, training module 102 would extract tokens {"tw", "wo", "wo", "or", "rd", "ds"}. The frequency of each extracted token is determined with reference to the entire training data 101. In this example, the frequency of each token is provided in Table 1 below.

TABLE 1

| Token | Frequency |
|-------|-----------|
| "tw"  | 1 |
| "wo"  | 2 |
| "or"  | 1 |
| "rd"  | 1 |
| "ds"  | 1 |

In Table 2, exemplary data compiled from a larger input corpus is provided. Once the frequencies of all tokens of length n are determined from training data 101, the information is stored as frequency data 103. In some embodiments, frequency data 103 is stored in a database. In other embodiments, frequency data 103 is stored in a flat file.

TABLE 2

| Token | Frequency |
|-------|-----------|
| "tw"  | 6166 |
| "wo"  | 399 |

TABLE 2-continued

| Token | Frequency |
| --- | --- |
| "or" | 5840 |
| "rd" | 4982 |
| "ds" | 7909 |

To process new input data 104, the data is parsed by recognition module 105 into tokens of length n, where n is the same value as used by training module 102. In some embodiments, input data 104 comprises an entire document. In some embodiments, input data 104 undergoes preprocessing by preprocessor 106 into substrings. Preprocessing applied by preprocessor 106 can include tokenization based on known grammatical rules. For example, individual sentences may be extracted from input data 104 by detection of punctuation. For another example, individual words may be extracted from input data 104 by splitting the input on whitespace.

Recognition module 105 computes a score for each string or substring from input data 104. In some embodiments, a score is computed for only the substrings output by preprocessor 106. In other embodiments, a score is computed for all substrings of input data 104. In some embodiments, a score is computed for all substrings that fall within a range of lengths, for example, 3-20 characters.

The score for a given string or substring is computed based on the tokens present in that string or substring. In some embodiments, the score for a string or substrings is the sum of the log of the frequencies of each token present. In particular, a string S of length |S|=k will contain k−n+1 tokens $t_1 \ldots t_{k-n+1}$ of length n. Each token $t_i$ has corresponding frequency $f_i$ from frequency data 103. The composite score s for string S is then given by Equation 1.

$$s = \sum_{i=1}^{k-n+1} \log f_i \quad \text{Equation 1}$$

Using the sample data from Table 2, the word "two" would have a composite score s=log 6166+log 399=6.39. In some embodiments, the composite score is then normalized by the number of characters in the input string. Thus, in this example, the score would be 6.39/3=2.13. To determine whether a given string contains a unique identifier, the score or normalized score is compared to a threshold value. Scores falling below the threshold are considered to be likely identifiers and are flagged as such.

The identifiers 107 extracted from input data 104 are output for further processing. In an exemplary embodiments, the identifiers are output to storage for further review by an operator. In another exemplary embodiment, the identifiers are highlighted in a copy of input data 104 so that they may be reviewed in context and a final determination made on whether they are bona fide identifiers. In yet another exemplary embodiment, the identifiers are removed from input data 104, and a redacted version is provided.

As described above, embodiments of the present disclosure examine the inter-character novelty for a token. This novelty is compared to a clip level and any tokens more novel than this clip level are flagged as likely IDs. This approach allows recognition of patterns that are not known in advance. Any string that is unusual enough will be flagged as a potential identifier.

Figure 2:
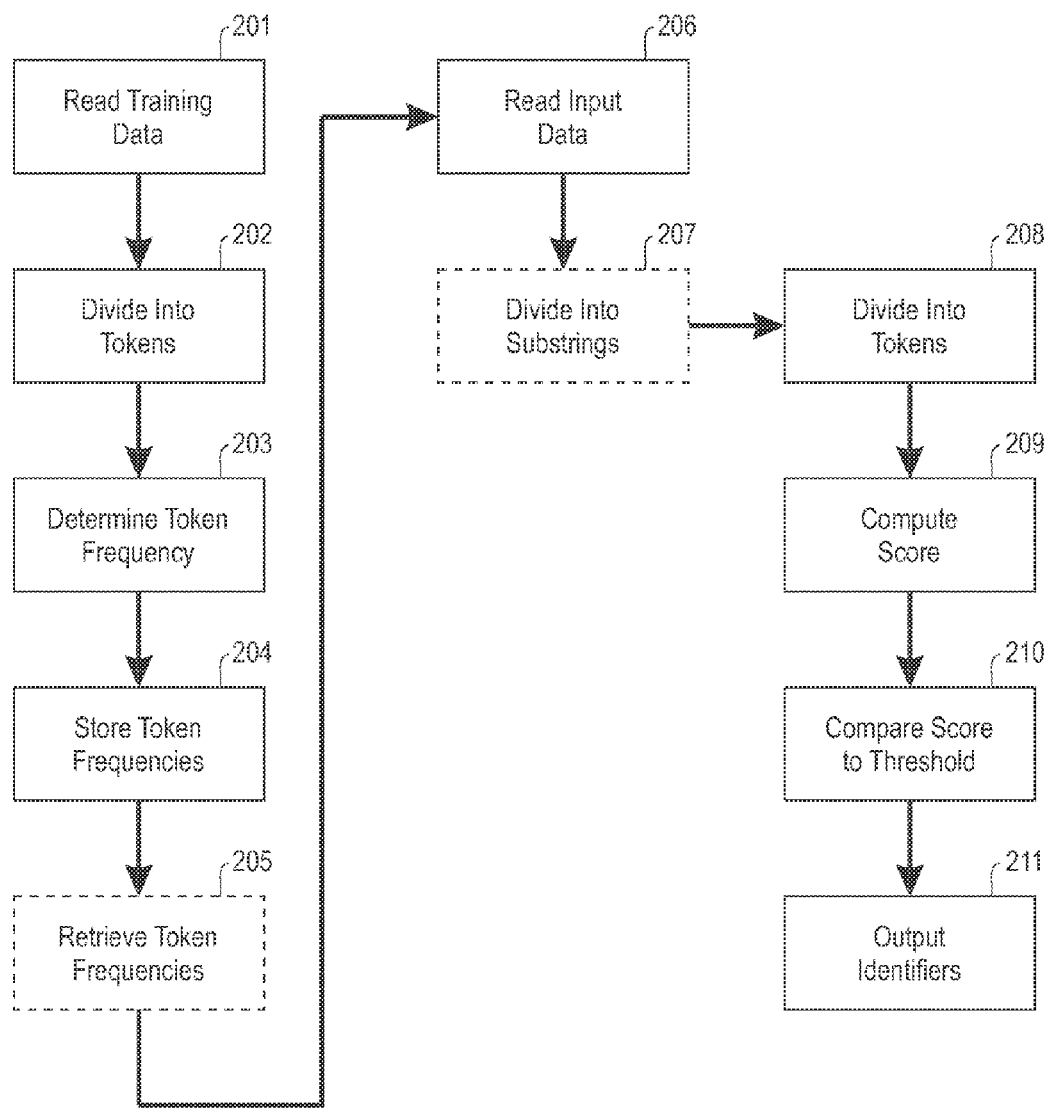
FIG. 2 depicts a method for surfacing of potentially sensitive identifiers according to an embodiment of the present disclosure.

Referring now to FIG. 2, a method is depicted for surfacing potentially sensitive identifiers according to an embodiment of the present disclosure. Training data is read 201. In some embodiments, the training data is read from a feed of data such as a microblogging feed or RSS feed. In some embodiment, the training data is read from a static corpus, such as an aggregate of documents related to a given subject matter. Training data is divided 202 into tokens. In some embodiments, the tokens are of fixed length n. In some embodiments, n=2. For each unique token, the frequency is determined 203. In some embodiment, the token frequency is determined by incrementing a counter for each instance of a given token detected in the input. In some embodiments, the token frequencies are stored 204 for later retrieval. In such embodiments, the token frequencies are later retrieved 205.

Input data is read 206. In some embodiments, the input data is read from a data feed. In some embodiment, the input data is read from a static data source such as an existing document or computer readable file. In some embodiments, the input data is divided into substrings. In other embodiments, all input data is handled together. Either the entire input data or a given substring is divided into tokens 208. Tokens are of length n, as described above with respect to step 202. A score is computed 209 based on the tokens. As described above, in some embodiments, the score is based on the frequency of each token in the training data. The score is compared to a predetermined threshold 210. In some embodiments, the score is normalized by the number of input characters prior to comparison with the threshold. Where the score is beneath the predetermined threshold, the analyzed string is considered a potential identifier and is output 211.

Figure 3:
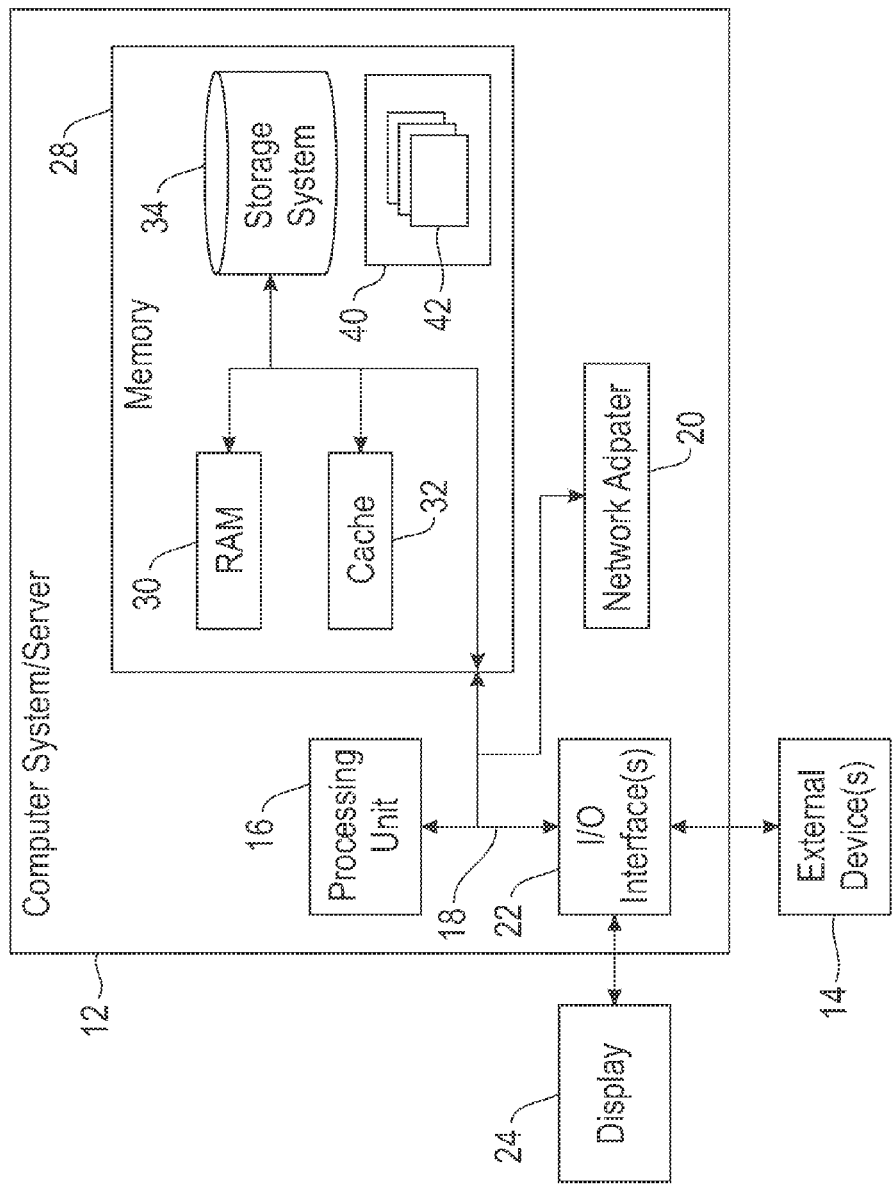
FIG. 3 depicts a computing node according to an embodiment of the present invention.

Referring now to FIG. 3, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, the computer comprising a hardware processor, the method comprising:
    reading an input string, the input string having a length;
    determining from the input string a plurality of tokens without regard to word boundaries, each of the tokens having a predetermined length, and every substring of the input string having the predetermined length being included as a token in the plurality of tokens;
    determining a score for each of the plurality of tokens, the score for each of the plurality of tokens corresponding to the frequency of each of the plurality of tokens within training data;
    determining, by the hardware processor, a composite score based on the scores of each of the plurality of tokens, wherein determining the composite score comprises summing the scores of each of the plurality of tokens or a function thereof; and
    determining whether the input string comprises an identifier by comparing the composite score to a predetermined threshold, the input string being considered to comprise an identifier when the composite score is less than the predetermined threshold.

2. The method of claim 1, wherein the predetermined length is greater than 1.

3. The method of claim 1, wherein the predetermined length is from 2 to 5.

4. The method of claim 1, wherein the frequency of each of the plurality of tokens is read from a datastore.

5. The method of claim 4, further comprising:
    normalizing the composite score by the length of the input string.

6. The method of claim 1, wherein the function comprises: a logarithm.

7. The method of claim 1, further comprising:
    reading training data;
    dividing the training data into a second plurality of tokens, each of the tokens having the predetermined length;
    determining a frequency for each of the second plurality of tokens; and
    storing the frequency for each of the second plurality of tokens.

8. The method of claim 1, further comprising:
    storing the input string if the input string comprises an identifier.

9. A computer program product for surfacing of potentially sensitive identifiers, the computer program product comprising a non-transitory computer readable storage medium having program instructions embodied therewith, the program instructions executable by a processor to cause the processor to perform a method comprising:
    reading an input string, the input string having a length;
    determining from the input string a plurality of tokens without regard to word boundaries, each of the tokens having a predetermined length, and every substring of the input string having the predetermined length being included as a token in the plurality of tokens;

determining a score for each of the plurality of tokens, the score for each of the plurality of tokens corresponding to the frequency of each of the plurality of tokens within training data;

determining a composite score based on the scores of each of the plurality of tokens, wherein determining the composite score comprises summing the scores of each of the plurality of tokens or a function thereof; and determining whether the input string comprises an identifier by comparing the composite score to a predetermined threshold, the input string being considered to comprise an identifier when the composite score is less than the predetermined threshold.

10. The computer program product of claim 9, wherein the frequency of each of the plurality of tokens is read from a datastore.

11. The computer product of claim 10, wherein the method further comprises:

normalizing the composite score by the length of the input string.

12. The computer program product of claim 9, wherein the function comprises:

a logarithm.

13. The computer program product of claim 9, wherein the method further comprises:

reading training data;

dividing the training data into a second plurality of tokens, each of the tokens having the predetermined length;

determining a frequency for each of the second plurality of tokens; and storing the frequency for each of the second plurality of tokens.

14. The computer program product of claim 9, wherein the method further comprises:

storing the input string if the input string comprises an identifier.

15. The computer program product of claim 9, wherein the predetermined length is greater than 1.

16. The computer program product of claim 9, wherein the predetermined length is from 2 to 5.

* * * * *